(12) United States Patent
Toyota et al.

(10) Patent No.: US 11,745,145 B2
(45) Date of Patent: Sep. 5, 2023

(54) ION-SENSITIVE SUBSTANCE, ION-SENSITIVE MEMBRANE USING THE SAME, AND METHOD FOR PRODUCING THE ION-SENSITIVE SUBSTANCE

(71) Applicant: Panasonic Intellectual Property Management Co., Ltd., Osaka (JP)

(72) Inventors: Kei Toyota, Osaka (JP); Norihito Tsukahara, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 102 days.

(21) Appl. No.: 17/241,838

(22) Filed: Apr. 27, 2021

(65) Prior Publication Data

US 2021/0362096 A1 Nov. 25, 2021

(30) Foreign Application Priority Data

May 25, 2020 (JP) .................................. 2020-090602

(51) Int. Cl.
*B01D 69/10* (2006.01)
*B01D 71/46* (2006.01)
(Continued)

(52) U.S. Cl.
CPC ............. *B01D 69/10* (2013.01); *B01D 71/30* (2013.01); *B01D 71/46* (2013.01); *C07F 7/1804* (2013.01); *B01D 2311/2649* (2013.01)

(58) Field of Classification Search
CPC ........ B01D 69/10; B01D 71/30; B01D 71/46; B01D 2311/2649; C07F 7/1804;
(Continued)

(56) References Cited

U.S. PATENT DOCUMENTS

| 5,958,201 A | 9/1999 | Craig et al. |
| 2005/0164019 A1* | 7/2005 | Liu ....................... C07F 7/1804 |
| | | 428/917 |

(Continued)

FOREIGN PATENT DOCUMENTS

| JP | 2000-119291 | 4/2000 |
| JP | 2000-121602 | 4/2000 |

(Continued)

OTHER PUBLICATIONS

Chinese Search Report dated Jul. 14, 2023 in corresponding Chinese Patent Application No. 202110555057.8, designating U.S. Pat. No. 5,958,201 as category Y prior art.

*Primary Examiner* — Krishnan S Menon
(74) *Attorney, Agent, or Firm* — Wenderoth, Lind & Ponack, L.L.P.

(57) ABSTRACT

An ion-sensitive substance containing a crown ether structure composed of a repeating unit represented by formula (a): $-CR^1R^2-CR^3X-O-\ldots$ (a) (in the formula, X is an organic group having an alkoxysilyl group at a terminal, and $R^1$, $R^2$ and $R^3$ are each a hydrogen atom or a hydrocarbon group), and a part or all of the alkoxysilyl groups in the crown ether structure may be hydrolyzed to form a silanol group.

13 Claims, 4 Drawing Sheets

(51) Int. Cl.
*C07F 7/18* (2006.01)
*B01D 71/30* (2006.01)

(58) Field of Classification Search
CPC ......... C08G 77/14; C08J 5/18; C08J 2383/06; G01N 27/3335
See application file for complete search history.

(56) References Cited

U.S. PATENT DOCUMENTS

2008/0185288 A1    8/2008  Yokokawa
2021/0238205 A1*  8/2021  Nakahata ............... C07F 7/1804

FOREIGN PATENT DOCUMENTS

| | | |
|---|---|---|
| JP | 2005-114428 | 4/2005 |
| JP | 2008-191058 | 8/2008 |
| JP | 2015-000958 | 1/2015 |

* cited by examiner

|  |  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| First compound | 3-glycidoxypropyl-methyldimethoxysilane | Parts by mass | 22.03 | 19.83 | 2.2 | 11.02 | 17.62 | 4.41 | 0 | 19.83 | 19.83 | 15.42 |
|  | 3-glycidoxypropyltrime-thoxysilane | Parts by mass | 0 | 0 | 0 | 11.82 | 0 | 18.9 | 0 | 0 | 0 | 0 |
|  | 3-glycidoxypropyl-methyldiethoxysilane | Parts by mass | 0 | 0 | 0 | 0 | 0 | 0 | 24.84 | 0 | 0 | 0 |
| Second compound | Methyltrimethoxysilane | Parts by mass | 0 | 1.36 | 12.26 | 0 | 27.24 | 0 | 0 | 1.36 | 1.36 | 4.09 |
| Alkali metal salt | Lithium perchlorate | Parts by mass | 2.66 | 0 | 0 | 0 | 0 | 0 | 0 | 2.66 | 0 | 0 |
|  | Sodium trifluoroacetate | Parts by mass | 0 | 0 | 0 | 0 | 0 | 0 | 0 | 0 | 3.4 | 0 |
|  | Potassium iodide | Parts by mass | 0 | 4.15 | 4.15 | 4.15 | 4.15 | 4.15 | 4.15 | 0 | 0 | 4.15 |
| Ratio with respect to molar number of second compound | | R1 | 0 | 0.1 | 0.9 | 0 | 0.71 | 0 | 0 | 0.1 | 0.1 | 0.3 |
| Ratio with respect to molar number of alkoxy group | | R2 | 2 | 2.1 | 2.9 | 2.5 | 2.71 | 2.8 | 2 | 2.1 | 2.1 | 2.3 |
| Various performances | Retention rate | % | 92 | 94 | 91 | 90 | 96 | 94 | 95 | 91 | 91 | 91 |
|  |  | Determination | A | A | A | A | jA | A | A | A | A | A |
|  | Potential response | mV/decade | 45.1 | 49.3 | 42.4 | 47.5 | 44.3 | 46.8 | 44.1 | 49.1 | 43.6 | 59.5 |
|  |  | Determination | B | B | B | B | B | B | B | B | B | A |
|  | Elastic modulus | MPa | 95 | 110 | 495 | 231 | 366 | 410 | 97 | 115 | 115 | 116 |
|  |  | Determination | B | A | B | A | B | B | B | A | A | A |

FIG. 5

| | | | Example 11 | Example 12 | Example 13 | Example 14 | Example 15 | Example 16 | Example 17 | Example 18 | Example 19 | Comparative example 1 |
|---|---|---|---|---|---|---|---|---|---|---|---|---|
| First compound | 3-glycidoxypropyl-methyldimethoxysilane | Parts by mass | 15.42 | 11.02 | 11.02 | 17.62 | 17.62 | 0 | 0 | 1.1 | 0 | — |
| | 3-glycidoxypropyltrimethoxysilane | Parts by mass | 0 | 0 | 0 | 0 | 0 | 23.63 | 21.27 | 0 | 0 | — |
| | 3-glycidoxypropyl-methyldiethoxysilane | Parts by mass | 0 | 0 | 0 | 0 | 0 | 0 | 0 | 0 | 1.24 | — |
| Second compound | Methyltrimethoxysilane | Parts by mass | 2.04 | 0 | 0 | 0 | 0 | 0 | 1.36 | 12.94 | 0 | — |
| | Dimethyldimethoxysilane | Parts by mass | 1.8 | 6.01 | 6.01 | 2.4 | 0 | 0 | 0 | 0 | 11.42 | — |
| | Cyclohexylmethyl-dimethoxysilane | Parts by mass | 0 | 0 | 0 | 0 | 4.13 | 0 | 0 | 0 | 0 | — |
| Alkali metal salt | Potassium iodide | Parts by mass | 4.15 | 4.15 | 4.15 | 4.15 | 4.15 | 4.15 | 4.15 | 4.15 | 4.15 | — |
| | Ratio with respect to molar number of second compound | R1 | 0.3 | 0.5 | 0.5 | 0.2 | 0.2 | 0 | 0.1 | 0.95 | 0.95 | — |
| | Ratio with respect to molar number of alkoxy group | R2 | 2.15 | 2 | 2 | 2 | 2.5 | 3 | 3 | 2.95 | 2 | — |
| Various performances | Retention rate | % | 93 | 94 | 95 | 93 | 92 | 96 | 95 | 96 | 90 | 72 |
| | | Determination | A | A | A | A | A | A | A | A | A | D |
| | Potential response | mV/decade | 52 | 53 | 55 | 51 | 56 | 45.8 | 46 | 38.8 | 37.6 | 55 |
| | | Determination | A | A | A | A | A | B | B | C | C | A |
| | Elastic modulus | MPa | 117 | 100 | 101 | 105 | 126 | 751 | 670 | 654 | 115 | — |
| | | Determination | A | B | B | B | A | C | C | C | B | — |

ION-SENSITIVE SUBSTANCE, ION-SENSITIVE MEMBRANE USING THE SAME, AND METHOD FOR PRODUCING THE ION-SENSITIVE SUBSTANCE

BACKGROUND

1. Technical Field

The present disclosure relates to an ion-sensitive substance, an ion-sensitive membrane using the same, and a method for producing the ion-sensitive substance.

2. Description of the Related Art

In recent years, a new medical system based on constant monitoring of health conditions and biological information of a person has been constructed. In other words, it is a medical system that detects signs of problems in health conditions earlier in daily life and displays them, for example, on an information terminal, thereby preventing diseases or leading to early detection. In addition to its use in the medical system, monitoring human biological information and comfort and discomfort related to the five senses can provide useful information for a person to live more comfortably, which is beneficial to the lives of people and society as a whole.

Examples of a monitoring target of biological information including such health conditions include ions in a human body fluid. Although the body contains various ions, it is known that the ion concentration varies depending on health conditions. In order to constantly monitor ions in sweat, an ion selective electrode that can be constantly brought into contact with human skin is required. An important component in determining the performance of an ion-selective electrode is an ion-sensitive membrane, which has the function of allowing only specific ions to pass through. Conventional ion-sensitive membranes are generally prepared by mixing an ion-sensitive substance, also called an ionophore, with a plasticizer in a membrane support.

Japanese Patent Unexamined Publication No. 2000-121602 proposes an ion-sensitive substance containing a crown ether derivative structure.

SUMMARY

An aspect of the present disclosure is an ion-sensitive substance containing a crown ether structure composed of a repeating unit represented by formula (a):

where X is an organic group having an alkoxysilyl group at a terminal, and $R^1$, $R^2$ and $R^3$ are each a hydrogen atom or a hydrocarbon group, wherein a part or all of the alkoxysilyl groups in the crown ether structure may be hydrolyzed to form a silanol group.

Another aspect of the present disclosure is a method for producing an ion-sensitive substance comprising:

a step of preparing a solution obtained by dissolving an alkali metal salt or a salt of a Group 2 element in a liquid containing a first compound having an epoxy group and an alkoxysilyl group at a terminal;

a step of allowing the solution to stand or heating the solution to form a solid; and a step of immersing the solid in water after the step of allowing the solution to stand or heating the solution, and drying the solid after removing the water.

DETAILED DESCRIPTIONS

Japanese Patent Unexamined Publication No. 2000-121602 proposes an ion-sensitive substance containing a crown ether derivative structure. However, it has been found that ion-sensitive membranes containing such an ion-sensitive substance have insufficient durability when repeatedly used as an ion-selective electrode.

One of the objects of the present disclosure is to provide an ion-sensitive substance exhibiting sufficient durability, an ion-sensitive membrane using the same, and a method for producing the ion-sensitive substance.

Aspect 1 of the present disclosure is an ion-sensitive substance containing a crown ether structure composed of a repeating unit represented by formula (a):

(in the formula, X is an organic group having an alkoxysilyl group at a terminal, and $R^1$, $R^2$ and $R^3$ are each a hydrogen atom or a hydrocarbon group), in which a part or all of the alkoxysilyl groups in the crown ether structure may be hydrolyzed to form a silanol group.

Aspect 2 of the present disclosure is the ion-sensitive substance of Aspect 1, in which the crown ether structure is a polymer containing a portion derived from a first compound having an epoxy group and an alkoxysilyl group at a terminal, and the polymer is obtained by cyclically polymerizing the epoxy group by ring-opening with an alkali metal salt or a Group 2 element salt.

Aspect 3 of the present disclosure is the ion-sensitive substance of Aspect 1 or 2, in which in formula (a), $R^1$, $R^2$ and $R^3$ are each a hydrogen atom and X is represented by formula (b):

(in the formula, Y is a monovalent organic group having the alkoxysilyl group at a terminal).

Aspect 4 of the present disclosure is the ion-sensitive substance of Aspect 2, in which a cation of the alkali metal salt or the salt of the Group 2 element is any of lithium ion, sodium ion, and potassium ion.

Aspect 5 of the present disclosure is the ion-sensitive substance of any one of Aspects 1 to 4, in which the number of repetitions of formula (a) is 4 or more and 6 or less.

Aspect 6 of the present disclosure is an ion-sensitive membrane including the ion-sensitive substance of any one of Aspects 1 to 5, in which a portion derived from the alkoxysilyl group constitutes a siloxane bond.

Aspect 7 of the present disclosure is the ion-sensitive membrane of Aspect 6, in which the siloxane bond is constituted by a portion derived from the alkoxysilyl group in the crown ether structure and a portion derived from an alkoxysilyl group in a compound represented by formula (c):

$$R^4—Z \quad (c)$$

(in the formula, $R^4$ is a monovalent hydrocarbon group, and Z is a monovalent organic group having an alkoxysilyl group at a terminal).

Aspect 8 of the present disclosure is the ion-sensitive membrane of Aspect 7, in which a ratio of a molar number of a portion derived from Z in formula (c) to a sum of a molar number of a portion derived from X in formula (a) and a molar number of a portion derived from Z in formula (c) is 0.9 or less.

Aspect 9 of the present disclosure is the ion-sensitive membrane of Aspect 7 or 8, in which a ratio of a sum of a molar number of a portion derived from the alkoxy group in X and a molar number of a portion derived from the alkoxy group in Z to a sum of a molar number of a portion derived from X in formula (a) and a molar number of a portion derived from Z in formula (c) is 2.00 or more and 2.90 or less.

Aspect 10 of the present disclosure is a method for producing an ion-sensitive substance including:

a step of preparing a solution obtained by dissolving an alkali metal salt or a salt of a Group 2 element in a liquid containing a first compound having an epoxy group and an alkoxysilyl group at a terminal;

a step of allowing the solution to stand or heating the solution to form a solid; and a step of immersing the solid in water after the step of allowing to stand or heating, and drying the solid after removing the water.

Aspect 11 of the present disclosure is the production method of Aspect 10, in which the liquid further contains a second compound having a hydrocarbon group and an alkoxysilyl group at a terminal.

According to the present disclosure, it is possible to provide an ion-sensitive substance exhibiting sufficient durability, an ion-sensitive membrane using the same, and a method for producing the ion-sensitive substance.

The ion-sensitive substance according to the exemplary embodiment of the present disclosure will be described in detail below.

Ion-Sensitive Substance

An ion-sensitive substance according to an exemplary embodiment of the present disclosure contains a crown ether structure composed of a repeating unit represented by formula (a):

$$—CR^1R^2—CR^3X—O— \quad (a)$$

(in the formula, X is an organic group having an alkoxysilyl group at a terminal, $R^1$, $R^2$ and $R^3$ are each a hydrogen atom or a hydrocarbon group, and $R^1$ or $R^2$ and X may be bonded to each other). A part or all of the alkoxysilyl group in the crown ether structure may be hydrolyzed to form a silanol group.

Such an ion-sensitive substance can be used for an ion-selective electrode because it exhibits ion selectivity due to a central portion where two carbon atoms and one oxygen atom are repeatedly bonded in this order in a cyclic manner (hereinafter referred to simply as "cyclic structure"), and alkali metal ions or Group 2 element ions supported thereon.

Furthermore, since a plurality of organic groups having an alkoxysilyl group (or silanol group) at the terminal are present as side chains extending from the central cyclic structure, and the alkoxysilyl group (or silanol group) can be strongly bonded to the support of the electrode, the ion selectivity can be maintained without losing the central cyclic structure even when repeatedly used as an ion-selective electrode.

$R^1$, $R^2$ and $R^3$ may be hydrogen or an alkyl group having 1 or more and 3 or less carbon atoms. Alternatively, $R^1$ or $R^2$ and X may be bonded, for example, $R^2$ and $R^3$ may be hydrogen, and two C in formula (a) and $R^1$ and X may form a cyclohexane ring together.

In a preferred exemplary embodiment, the crown ether structure is a polymer containing a portion derived from a first compound having an epoxy group and an alkoxysilyl group at a terminal, and the polymer is obtained by cyclically polymerizing the epoxy group by ring-opening with an alkali metal salt or a Group 2 element salt to form a ring. Thus, an ion-sensitive substance suitable for detecting the cation of an alkali metal salt or a salt of a Group 2 element used for ring-opening of the epoxy group can be obtained. Preferably, the cation of the alkali metal salt or the salt of the Group 2 element is any of lithium ion, sodium ion or potassium ion. As a result, an ion-sensitive substance suitable for detecting any of lithium ion, sodium ion, and potassium ion can be obtained.

In a preferred exemplary embodiment, in formula (a), $R^1$, $R^2$ and $R^3$ are each a hydrogen atom and X is represented by formula (b):

$$—CH_2O—Y \quad (b)$$

(in the formula, Y is a monovalent organic group having the alkoxysilyl group at a terminal).

With such a structure, the cyclic structure is easily formed stably.

Y is a monovalent organic group having the alkoxysilyl group at a terminal, and is further embodied by formula (d):

$$C_nH_{2n-2m-f}4SiR^5{}_{3-g}(OR^6)_g \quad (d)$$

$R^5$ and $R^6$ may be each independently at each occurrence any of a methyl group, an ethyl group, a propyl group, a butyl group, an isopropyl group, a pentyl group, an isobutyl group, a hexyl group, a phenyl group and a cyclohexyl group, and $R^5$ and $R^6$ may be the same or different. Among them, a methyl group and an ethyl group can be suitably used in that they are easily subjected to a sol-gel reaction and easily form a siloxane bond to produce an ion-sensitive membrane.

n may be an integer 0 or more and 8 or less. When n is 8 or less, the ion-sensitive substance can be easily produced by the production method described later, which is preferable. Further, n is preferably 3 or more, from the viewpoint that steric hindrance caused by the alkoxy group ($OR^3$) bonded to the silicon (Si) atom can be suppressed by securing a distance to the Si atom in the ring-opening polymerization of the epoxy groups. In the hydrocarbon represented by $C_nH_{2n-2m-4f}$, m is the sum of the number of double bonds and the number of ring structures in the hydrocarbon, and f is the number of triple bonds in the hydrocarbon.

g is an integer of 1 or more and 3 or less. As g becomes smaller, the ratio of the bonding between the alkoxy groups becomes smaller in the production of the ion-sensitive membrane described later. Accordingly, the volume shrinkage at the time of siloxane bond formation can be suppressed, and the occurrence of the internal crack in the ion-sensitive membrane due to the volume shrinkage can be suppressed. On the other hand, as g becomes larger, the elastic modulus of the ion-sensitive membrane can be increased in the production of the ion-sensitive membrane by forming a siloxane bond. From the viewpoint of achieving both crack suppression and elastic modulus, g is preferably 2.

The number of repetitions of formula (a) is preferably 4 or more. As a result, a large number of terminal alkoxy groups (at least four or more) can be secured, and the loss of the cyclic structure can be further suppressed. On the other hand, the number of repetitions is preferably 10 or less. Accordingly, the size of the crown ether structure can be set to a size suitable for detecting main ions in a living body, such as sodium ions, potassium ions, and calcium ions. Furthermore, the number of repetitions is more preferably 6 or less, as it is particularly suitable for detecting important ions such as potassium ion and sodium ion.

An example of such an ion-sensitive substance is a compound of chemical formula 1 or 2:

(Formula 1)

(Formula 2)

The difference between the compounds of chemical formulas 1 and 2 is that in the compound of chemical formula 2, three of the eight terminal methoxysilyl groups ($SiOCH_3$) are hydrolyzed to form silanol groups (SiOH). Ion-sensitive membrane By bonding the ion-sensitive substance to, for example, an inorganic material or a polymer support, an ion-sensitive membrane can be formed and used as an ion-selective electrode. Further, a support can also be formed by constituting the siloxane bond with the portion derived from the alkoxysilyl group in the ion-sensitive substance. That is, by hydrolyzing at least a part of the alkoxysilyl group of the ion-sensitive substance and causing a dehydration condensation reaction, an ion-sensitive membrane having a support composed of a siloxane bond and a cyclic structure bonded thereto can be formed.

The siloxane bond is preferably constituted by a portion derived from an alkoxysilyl group in the crown ether structure and a portion derived from an alkoxysilyl group of a compound represented by formula (c):

$$R^4—Z \qquad (c)$$

(in the formula, $R^4$ is a monovalent hydrocarbon group, and Z is a monovalent organic group having an alkoxysilyl group at a terminal).

By forming the siloxane bond by mixing with the compound of formula (c) rather than forming the siloxane bond with an alkoxysilyl group alone in the crown ether structure, it is possible to control the density of the cyclic structure in the ion-sensitive membrane and to control the potential response to a desired level. Further, by adjusting the number of alkoxy groups and/or hydrocarbon groups of the compound of formula (c), it is possible to adjust the mechanical properties of the ion-sensitive membrane.

More specifically, formula (c) may also be represented by formula (e):

$$R^{41}_pR^{42}_qR^{43}_r Si(OR^7)_a(OR^8)_b(OR^9)_c \qquad (e)$$

$R_{41}$, $R^{42}$ and $R^{43}$ are not particularly limited, but may be, for example, a hydrocarbon group represented by general formula $C_sH_{2s+1-2t-4u}$. s may be 1 or more and 20 or less. By setting s to 20 or less, it is possible to prevent excessively large steric hindrance and relatively easily form a siloxane bond. t is the sum of the number of double bonds and ring structures in the hydrocarbon group, and u is the number of triple bonds in the hydrocarbon group. $R^{41}$, $R^{42}$ and $R^{43}$ may all be the same or different.

Specific examples of $R^{41}$, $R^{42}$ and $R^{43}$ include a methyl group, an ethyl group, a propyl group, a butyl group, a hexyl group, a phenyl group, a cyclohexyl group, an octyl group, a decyl group and an allyl group.

In forming the siloxane bond, a preferable ratio of the molar number of a portion derived from Z in formula (c) to the sum of the molar number of a portion derived from X in formula (a) and a molar number of a portion derived from Z in formula (c) (hereinafter referred to as "R1") is 0.9 or less. By setting R1 to 0.9 or less, the density of the cyclic structure in the ion-sensitive membrane can be kept high, and the potential response can be increased. More preferably, R1 is 0.5 or less. On the other hand, by increasing R1, a cyclic structure can be stably formed. R1 is 0 or more, preferably more than 0, and more preferably 0.2 or more.

Furthermore, X in formula (a) and Z in formula (c) may each have 1 to 3 alkoxy groups at the terminals. At this time, a preferable ratio of the sum of the molar number of a portion derived from the alkoxy group in X and the molar number of a portion derived from the alkoxy group in Z to the sum of the molar number of a portion derived from X in formula (a) and the molar number of a portion derived from Z in formula (c) (hereinafter referred to as "R2") is 2.00 or more and 2.90 or less. By setting R2 to 2.00 or more, the siloxane bond density can be increased, and as a result, it is possible to increase the elastic modulus of the ion-sensitive membrane, and the shape of the membrane can be easily maintained. Preferably, R2 is 2.10 or more. On the other hand, by setting R2 to 2.90 or less, it is possible to suppress an excessively high density of siloxane bonds, and as a result, it is possible to suppress the occurrence of cracks in the ion-sensitive membrane and impart flexibility. More preferably, R2 is 2.50 or less.

To the extent that the object of the exemplary embodiment of the present disclosure is achieved, the ion-sensitive substance and the ion-sensitive membrane according to the exemplary embodiment of the present disclosure may contain other components.

Method for Producing Ion-Sensitive Substance

A method for producing an ion-sensitive substance according to an exemplary embodiment of the present disclosure includes (A) a step of preparing a solution obtained by dissolving an alkali metal salt or a salt of a Group 2 element in a liquid containing a first compound having an epoxy group and an alkoxysilyl group at a terminal;

(B) a step of allowing the solution to stand or heating the solution;

(C) a step of immersing after the step of allowing to stand or heating, and drying after removing the water.

By this production method, the epoxy group is cyclically polymerized by ring-opening, whereby produced is an ion-sensitive substance containing a crown ether structure composed of a repeating unit represented by formula (a):

(in the formula, X is an organic group having an alkoxysilyl group at a terminal, $R^1$, $R^2$ and $R^3$ are each a hydrogen atom or a hydrocarbon group, and $R^1$ or $R^2$ and X may be bonded to each other).

In some cases, an ion-sensitive membrane in which a portion derived from the alkoxysilyl group in the ion-sensitive substance constitutes a siloxane bond can also be produced by this production method.

Each step will be described below.

(A) Step of Preparing Solution

A solution obtained by dissolving an alkali metal salt or a salt of a Group 2 element in a liquid containing a first compound having an epoxy group and an alkoxysilyl group at a terminal is prepared.

The first compound is represented by formula (f):

Here, G may be a functional group having an epoxy group, and examples of the functional group having an epoxy group include a glycidoxy group and an epoxycyclohexyl group, and the glycidoxy group is preferably used from the viewpoint that a cyclic structure can be easily obtained upon ring-opening polymerization.

Y is a monovalent organic group having the alkoxysilyl group at a terminal, and is further embodied by formula (d):

$R^5$ and $R^6$ may be each independently at each occurrence any of a methyl group, an ethyl group, a propyl group, a butyl group, an isopropyl group, a pentyl group, an isobutyl group, a hexyl group, a phenyl group and a cyclohexyl group, and $R^5$ and $R^6$ may be the same or different. Among them, a methyl group and an ethyl group can be suitably used in that they are easily subjected to a sol-gel reaction and easily form a siloxane bond to produce an ion-sensitive membrane.

n may be an integer 0 or more and 8 or less. By setting n to 8 or less, it is possible to suppress the excessive increase in the hydrophobicity of the first compound and ensure the solubility of the alkali metal salt or the salt of the Group 2 element in the liquid of the first compound, which is preferable. Further, n is preferably 3 or more, from the viewpoint that steric hindrance caused by the alkoxy group ($OR^3$) bonded to the silicon (Si) atom can be suppressed by securing a distance to the Si atom in the ring-opening polymerization of the epoxy groups. In the hydrocarbon represented by $C_nH_{2n-2m-4f}$, m is the sum of the number of double bonds and the number of ring structures in the hydrocarbon, and f is the sum of the number of triple bonds and the number of ring structures in the hydrocarbon.

g is an integer of 1 or more and 3 or less. The smaller g is, the smaller the ratio of the bonding between the alkoxy groups in the production of the ion-sensitive membrane, and the volume shrinkage at the time of siloxane bond formation can be suppressed, and the occurrence of the internal crack in the ion-sensitive membrane due to the volume shrinkage can be suppressed. On the other hand, as g becomes larger, the elastic modulus of the ion-sensitive membrane can be increased in the production of the ion-sensitive membrane by forming a siloxane bond. From the viewpoint of achieving both crack suppression and elastic modulus, g is preferably 2.

Examples of the first compound include 3-glycidoxypropyltrimethoxysilane, 3-glycidoxypropylmethyldimethoxysilane, 3-glycidoxypropyltriethoxysilane, 3-glycidoxypropylmethyldiethoxysilane, 2-(3,4-epoxycyclohexyl)trimethoxysilane, 2-(3,4-epoxycyclohexyl)methyldimethoxysilane, 2-(3,4-epoxycyclohexyl)triethoxysilane, and 2-(3,4-epoxycyclohexyl)methyldiethoxysilane.

The first compound can contain at least one of the compounds described above, or may be a mixture of two or more.

The alkali metal salt or the salt of the Group 2 element in step (A) is not particularly limited, but is composed of a combination of a cation of the alkali metal or the Group 2 element and an anion. Examples of the cation include lithium ion, sodium ion, potassium ion, magnesium ion, calcium ion and strontium ion. Examples of the anion include chloride ion, bromide ion, iodide ion, perchlorate ion, thiocyanate ion, tetrafluoroborate ion, trifluoroacetate ion, nitrate ion, sulfate ion, hexafluoroarsenate ion ($AsF_6^-$), and hexafluorophosphate ion ($PF_6^-$). Among them, lithium salts, sodium salts, and potassium salts are preferable from the viewpoint of high electron-withdrawing property and easy induction of ring-opening polymerization of an epoxy group, and lithium perchlorate, sodium trifluoroacetate, and potassium iodide are preferable from the viewpoint of high solubility in alkoxysilane.

Regarding the amount of the alkali metal salt or the salt of the Group 2 element added in step (A), the ratio R3 of the molar amount of the alkali metal salts or Group 2 element salts to the molar amount of the first compound is preferably 0.165 or more, and the ratio R4 of the sum of the amounts of the alkali metal salts or Group 2 element salts added to the sum of the molar amount of the first compound and the molar amount of the second compound is preferably 0.25 or less. By setting R3 to 0.165 or more, ring opening of the epoxy group in the first compound can be sufficiently promoted. Further, by setting R4 to 0.25 or less, it is possible to prevent the alkali metal salt or the salt of the Group 2 element from precipitating in the mixed liquid of the first compound and the second compound, and to obtain a homogeneous solution.

In step (A), it is preferable to add a second compound having a hydrocarbon group and an alkoxysilyl group at the terminal to the liquid. As a result, a cyclic structure can be easily formed, and for example, linear polymerization can be suppressed in the ring-opening polymerization of the epoxy groups in the first compound.

The second compound is represented by formula (c):

$$R^4\text{—}Z \qquad (c)$$

(in the formula, $R^4$ is a monovalent hydrocarbon group, and Z is a monovalent organic group having an alkoxysilyl group at a terminal), and more specifically, the second compound may also be represented by formula (e):

$$R^{41}{}_p R^{42}{}_q R^{43}{}_r Si(OR I(OR^8)_b(OR^9)_c \qquad (e)$$

$R^{41}$, $R^{42}$ and $R^{43}$ are not particularly limited, but can be, for example, a hydrocarbon group represented by general formula $C_sH_{2s+1-2t-4u}$. s may be 1 or more and 20 or less. By setting s to 20 or less, it is possible to prevent excessively large steric hindrance and relatively easily form a siloxane bond. t is the sum of the number of double bonds and ring structures in the hydrocarbon group, and u is the number of triple bonds in the hydrocarbon group. $R^{41}$, $R^{42}$ and $R^{43}$ may all be the same or different.

Specific examples of $R^{41}$, $R^{42}$ and $R^{43}$ include a methyl group, an ethyl group, a propyl group, a butyl group, a hexyl group, a phenyl group, a cyclohexyl group, an octyl group, a decyl group and an allyl group.

$R^7$, $R^8$ and $R^9$ may be a hydrocarbon group, and are preferably an alkyl group having 1 or more and 5 or less carbon atoms.

p, q, r, a, b and c are integers of 0 or more that satisfy $1 \leq p+q+r \leq 3$, $1 \leq a+b+c \leq 3$ and $p+q+r+a+b+c=4$.

As the amount of the second compound added, the ratio of the molar number of the second compound to the sum of the molar number of the first compound and the molar number of the second compound (that is, R1) is preferably 0.9 or less. By setting R1 to 0.9 or less, the density of the cyclic structure in the ion-sensitive membrane can be kept high, and the potential response can be increased. More preferably, R1 is 0.5 or less. On the other hand, by increasing R1, it is possible to suppress linear polymerization in the ring-opening polymerization of the epoxy groups. R1 is 0 or more, preferably more than 0, and more preferably 0.2 or more.

Furthermore, each of the first compound and the second compound may have 1 to 3 alkoxy groups at the terminals. At this time, as a preferable ratio of the alkoxy groups, the ratio of the sum of the molar number of the alkoxy groups in the first compound and the molar number of the alkoxy groups in the second compound to the sum of the molar number of the first compound and the second compound (that is, R2) is 2.00 or more and 2.90 or less. By setting R2 to 2.00 or more, the siloxane bond density can be increased, and as a result, the elastic modulus of the ion-sensitive membrane can be increased, and the shape of the membrane can be easily maintained. Preferably, R2 is 2.10 or more. On the other hand, by setting R2 to 2.90 or less, it is possible to suppress an excessively high density of siloxane bonds, and as a result, it is possible to suppress the occurrence of cracks in the ion-sensitive membrane and impart flexibility. More preferably, R2 is 2.50 or less.

The second compound can contain at least one compound represented by formula (c) or (e), or may be a mixture of two or more.

In step (A), an anion eliminating agent may be added to the solution. As the anion eliminating agent, known ones such as tetraphenylborate, sodium salt (DOJINDO LABORATORIES, Kalibor (registered trademark) (Na-TPB)) and tetrakis[3,5-bis(trifluoromethyl)phenyl]borate, sodium salt (DOJINDO LABORATORIES, T037 TFPB) can be used.

(B) Step of Allowing to Stand or Heating

In this step, the epoxy group is cyclically polymerized by ring-opening by the metal cation of the alkali metal salt or the salt of the group 2 element to form a crown ether structure. Further, an alkali metal ion or a group 2 element ion can be supported by a coordination bond from an oxygen atom in the crown ether structure. Furthermore, following the ring-opening polymerization reaction of the epoxy group, the hydrolysis and dehydration condensation reaction of the terminal alkoxysilyl group proceed to form a siloxane bond.

The time for allowing to stand or heat in the step (B) is preferably 20 minutes or more. More preferably, the time is 30 minutes or more, 1 hour or more, 24 hours or more, 100 hours or more, 500 hours or more, and 720 hours or more. This allows the ring-opening polymerization reaction of epoxy groups to proceed, thus yielding more ion-sensitive substances. Furthermore, the hydrolysis and dehydration condensation reaction of the terminal alkoxysilyl group following the ring-opening polymerization reaction of the epoxy group can be sufficiently promoted so as to form the ion-sensitive membrane.

The temperature at which step (B) is allowed to stand or is heated is preferably 20° C. or higher. Further, the ring-opening polymerization reaction of the epoxy group and the subsequent hydrolysis and dehydration condensation reaction of the terminal alkoxysilyl group can proceed in a shorter time by increasing the temperature, and the temperature is more preferably 23° C. or higher, 40° C. or higher, or 60° C. or higher. The humidity of step (B) is not particularly limited, and in order to promote the hydrolysis, it is preferable that the humidity is in an environment such as an air atmosphere (that is, more than 0% RH).

At the time of allowing to stand or heating in step (B), for example, the solution may be poured in a liquid state into a mold having a certain thickness and area to form an arbitrary shape. As the base material of the mold, a material composed of a known metal or polymer material can be used, and polytetrafluoroethylene is particularly preferable from the viewpoint of good releasability from the solid after step (B).

(C) Step of Immersing in Water, Removing Water, and Drying

In the solid formed after step (B), an ionic component derived from the alkali metal salt or the salt of the Group 2 element used for opening the ring of the epoxy group may remain. After immersing the solid in a polar solvent such as water, the polar solvent such as water is removed, and then the solid is dried by air drying or the like. As a result, the ion component derived from the alkali metal salt or the salt of the group 2 element used for the ring opening of the epoxy group is eluted and removed in a polar solvent such as water to obtain the ion-sensitive substance according to the exemplary embodiment of the present disclosure. The immersion time is preferably 24 hours or more because the ionic component can be sufficiently eluted.

To the extent that the object of the exemplary embodiment of the present disclosure is achieved, the method for producing the ion-sensitive substance according to the exemplary embodiment of the present disclosure may contain other steps.

EXAMPLES

Hereinafter, exemplary embodiments of the present disclosure will be described in more detail with reference to Examples. Exemplary embodiments of the present disclosure are not limited by the following Examples, and can be implemented with appropriate modifications within the scope that can conform to the spirit described above and below, and all of them are included in the technical scope of the exemplary embodiments of the present disclosure.

Example 1

As a liquid of the first compound having an epoxy group and an alkoxysilyl group at the terminal, 22.03 parts by mass of 3-glycidoxypropylmethyldimethoxysilane (manufactured by Shin-Etsu Chemical Co., Ltd., KBM402, number of alkoxy groups: 2) was prepared. To 3-glycidoxypropylmethyldimethoxysilane, 2.66 parts by mass of lithium perchlorate (manufactured by Kanto Chemical Co., Inc., CICA Grade 1) as an alkali metal salt was added and dissolved therein to prepare a solution.

The solution was poured into a mold made of polytetrafluoroethylene having a diameter of 40 mm and a depth of 0.5 mm, and allowed to stand in an environment of 23° C. and 60% RH for 720 hours. Thereafter, the obtained solid was immersed in water for 24 hours, the water was removed, and the solid was air-dried to obtain an ion-sensitive membrane.

Figure 1A:
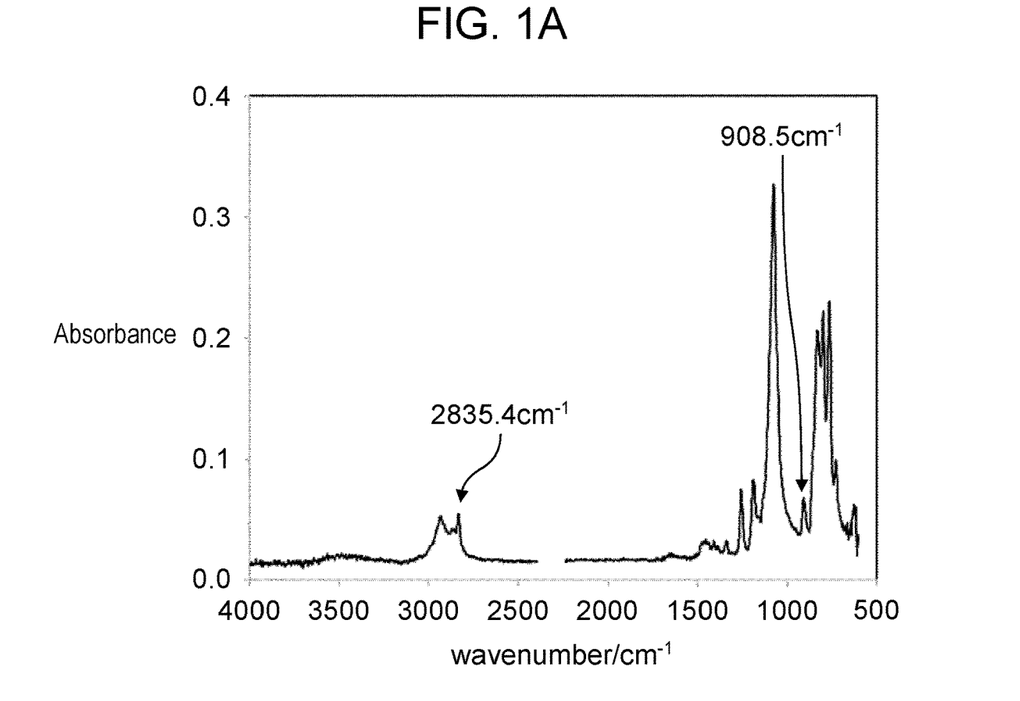
FIG. 1A is an attenuated total reflection FTIR spectrum of a solution of Example 1.
Figure 1B:
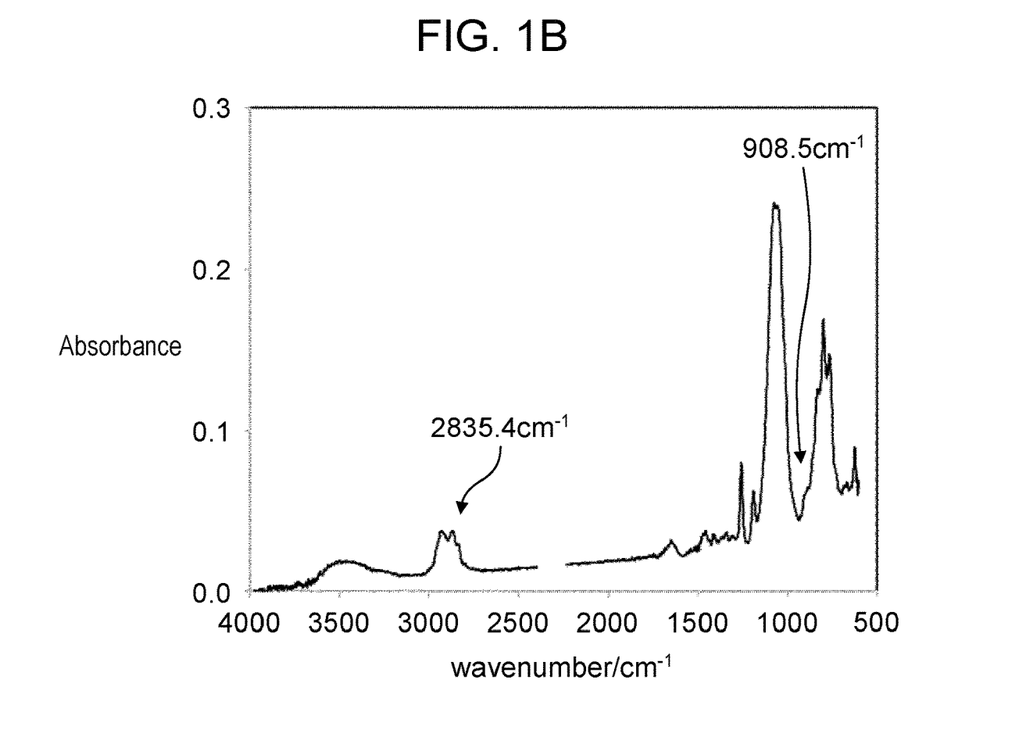
FIG. 1B is an attenuated total reflection FTIR spectrum of an ion-sensitive membrane of Example 1.

In order to analyze the structure of the solution and the ion-sensitive membrane of Example 1, the attenuated total reflection FTIR spectrum thereof was measured (Shimadzu Corporation, IRPrestige-21).

FIG. 1A is an attenuated total reflection FTIR spectrum of the solution of Example 1, and FIG. 1B is an FTIR spectrum of the ion-sensitive membrane of Example 1. In FIG. 1A, a peak of 908.5 $cm^{-1}$ characteristic of glycidoxy group and a peak of 2835.4 $cm^{-1}$ characteristic of methoxy group are observed, whereas in FIG. 1B, these peaks are not observed. This indicates that in the ion-sensitive membrane after being held at 23° C. for 60% RH for 720 hours, the ring-opening reaction of the glycidoxy groups and at least the subsequent hydrolytic reaction of the methoxy groups were completed, and the dehydration condensation reaction proceeded.

Figure 2:
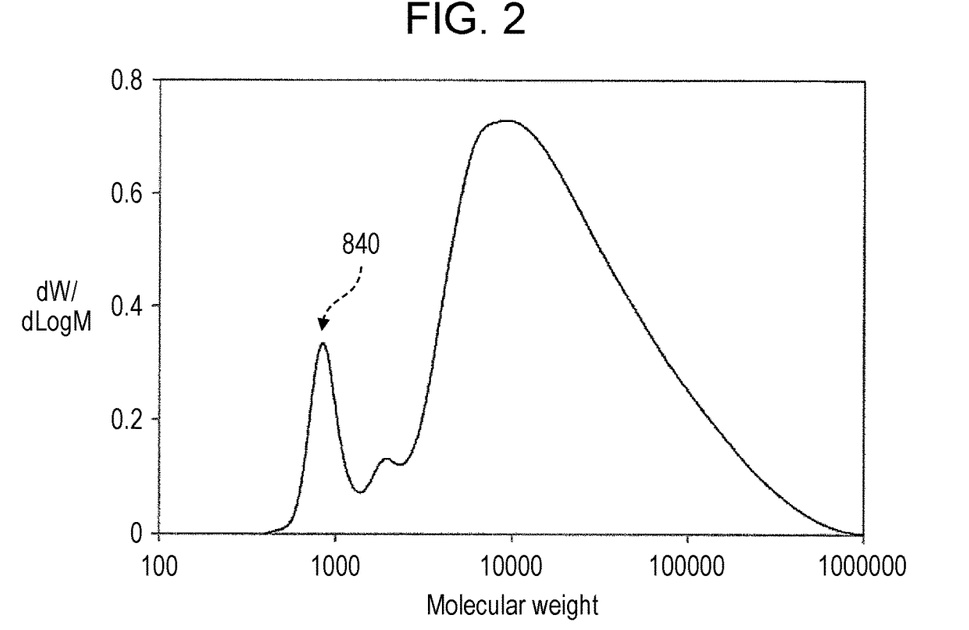
FIG. 2 is a GPC measurement result of the solution during reaction of Example 1.

The solution of Example 1 was subjected to GPC measurement in order to analyze the structure when the solution was allowed to stand for 120 hours in the middle in an environment of 23° C. and 60% RH (that is, the ring-opening reaction of the glycidoxy group and the subsequent hydrolysis and dehydration condensation reaction of the methoxy group were in progress). In the GPC measurement, 0.02% monoethanolamine-added THF (5 ml) was added as a solvent to 100 mg of the solution, and the mixture was stirred at about 90° C. for 2 hours. After filtering using a 0.45 μm filter and removing metal ions, GPC measurement is performed by a gel permeation chromatograph-multi-angle light scattering photometer.

FIG. 2 shows the GPC measurement result of the solution during the reaction of Example 1. In FIG. 2, a molecular weight peak was confirmed near 840. It is considered that a polymer containing a cyclic structure represented by chemical formula 1 is formed.

(Formula 1)

The compound of chemical formula 1 is obtained by cyclically polymerizing the glycidoxy groups of four 3-glycidoxypropylmethyldimethoxysilane by ring opening.

Actually, unlike the sample for GPC measurement, it is considered that a structure with lithium ions coordinated, as shown in chemical formula 3, is thought to be found, but as a result of the loss of lithium ions in the pretreatment for GPC measurement, the compound of chemical formula 1 above was detected in the sample for GPC measurement.

(Formula 3)

More specifically, the molecular weight of the compound of chemical formula 3 above is 880, which is larger than the GPC measurement result (840). Therefore, more accurately, the compound detected by GPC measurement is considered to have a structure as shown in chemical formula 2 below.

(Formula 2)

The difference between chemical formulas 1 and 2 above is that in the compound of the chemical formula 2, three out of eight methoxy groups are hydrolyzed to form a hydroxyl group. That is, it can be seen that in the state of the solution during the reaction in FIG. 2, the solution contains an ion-sensitive substance in which a part of the alkoxysilyl group at the terminal is hydrolyzed and the siloxane bond is not yet formed.

The production conditions were changed from Example 1 to prepare ion-sensitive membranes of Examples 2 to 19 and Comparative Example 1. In Examples 2 to 19, as the first compound, in addition to 3-glycidoxypropylmethyldimethoxysilane, 3-glycidoxypropyltrimethoxysilane (manufactured by Shin-Etsu Chemical Co., Ltd., KBM-403, number of alkoxy groups: 3) and 3-glycidoxypropylmethyldiethoxysilane (number of alkoxy groups: 2) were used. As the second compound, methyltrimethoxysilane (manufactured by Shin-Etsu Chemical Co., Ltd., KBM-13, number of alkoxy groups: 3), dimethyldimethoxysilane (manufactured by Shin-Etsu Chemical Co., Ltd., KBM22, number of alkoxy groups: 2), and cyclohexylmethyldimethoxysilane (number of alkoxy groups: 2) were used. As the alkali metal salt, in addition to lithium perchlorate, sodium trifluoroacetate (manufactured by Kanto Chemical Co., Inc.), potassium iodide (manufactured by Kanto Chemical Co., Inc.) and the like were used. For those containing the second compound, the second compound was added in advance to and dissolved in the first compound, and the alkali metal salt was dissolved therein. In Comparative Example 1, an ion-sensitive membrane was used in which an ion-sensitive substance composed of dibenzyl-14-crown-4 and a support PVC were bonded. As a preparation method of Comparative Example 1, 1 part by weight of PVC having an average degree of polymerization of 1100 was dissolved in 26.6 parts by weight of tetrahydrofuran (manufactured by Kanto Chemical Co., Ltd.), 2 parts by weight of 2-nitrophenyl octyl ether (manufactured by FUJIFILM Wako Pure Chemical Corporation) was further added as a plasticizer, and dissolved with 0.1 parts by weight of dibenzyl-14-crown-4 (manufactured by FUJIFILM Wako Pure Chemical Corporation). This solution was poured into the polytetrafluoroethylene mold used in Example 1 and dried in the air for about 12 hours, and the obtained membrane was used as an ion-sensitive membrane of Comparative Example 1.

In the solutions of Examples 2 to 19, GPC measurement was performed in the same manner as in Example 1 (that is, after allowing to stand for 120 hours in the middle). For the one using lithium perchlorate as the alkali metal salt (Example 8), an ion-sensitive substance with four epoxy groups cyclically polymerized by ring-opening was confirmed, as in Example 1. For the one using sodium trifluoroacetate as the alkali metal salt (Example 9), an ion-sensitive substance with five epoxy groups cyclically polymerized by ring-opening was confirmed. For those using potassium iodide as the alkali metal salt (Examples 2 to 7, 1 to 19), an ion-sensitive substance with six epoxy groups cyclically polymerized by ring-opening was confirmed.

The potential response, durability against repeated use (hereinafter referred to as "retention rate"), and elastic modulus of the ion-sensitive membranes obtained by each Example and each Comparative Example were evaluated.

Potential Response and Retention Rate

Figure 3:
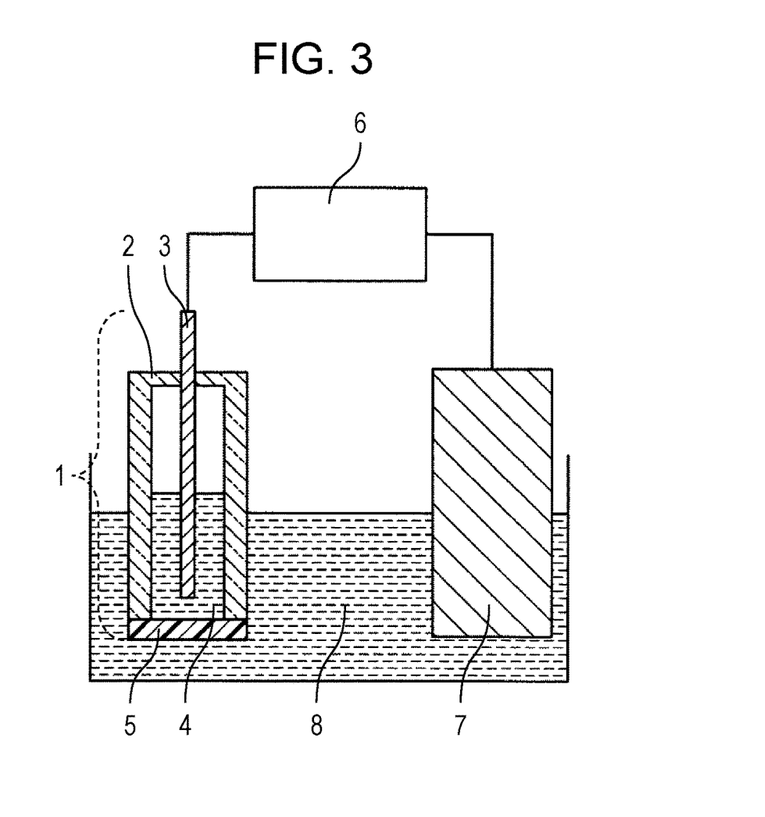
FIG. 3 is a schematic cross-sectional view of a potential response measuring apparatus used in Examples.

FIG. 3 shows a schematic view of the apparatus used for the potential response measurement. As shown in FIG. 3, ion-sensitive membrane 5 was placed on glass electrode body 2 in working electrode 1, and internal electrolytic solution 4 and silver chloride electrode 3 were further provided inside. Further, reference electrode 7 was immersed in sample solution 8 for ion measurement, and the potential difference between working electrode 1 and reference electrode 7 was measured by potentiometer 6. As reference electrode 7, a known one in which a silver/silver chloride electrode and an internal electrolyte aqueous solution were provided in a plastic body and a porous ceramic was used for the liquid junction was used. The internal electrolyte aqueous solution and internal electrolytic solution 4 were changed according to the ions to be measured. That is, in Examples 2 to 7, and in Examples 10 to 19, a saturated aqueous potassium chloride solution was used, in Examples 1 and 8 and Comparative Example 1, a saturated aqueous lithium chloride solution was used, and in Example 9, a saturated aqueous solution of sodium chloride was used.

The potential difference was measured with potentiometer 6 using several standard solutions having known concentrations of ions to be measured, and the potential response was measured. Furthermore, the potential response measurement was repeated 30 times for each Example, and the ratio (percentage) of the 30th potential response to the initial potential response was defined as the retention rate (%).

As criteria for determining the retention rate, "A" was given when the retention rate was 90% or more as an excellent range, "B" was given when the retention rate was 80% or more as a normal range, and "D" was given when the retention rate was less than 80% as an insufficient range.

The higher the potential response, the better. As criteria for determination, "A" was given to those with a potential response of 50 mV/decade or more as a range of particularly excellent potential response, "B" was given to those with a potential response of 40 mV/decade or more as a range of excellent potential response, and "C" was given to those with a potential response of 35 mV/decade or more as a range of acceptable potential response.

Elastic Modulus

In each of the Examples and Comparative Examples, a strip of 5 mm×30 mm was cut out from the prepared ion-sensitive membrane, and the elastic modulus was measured using a known tensile strength meter.

By setting the elastic modulus within a predetermined range, it is possible to secure the strength while suppressing the occurrence of cracks in the ion-sensitive membrane. "B" was given to those with an elastic modulus of 95 MPa or more and 500 MPa or less as a preferred range of elastic modulus, and "A" was given to those with an elastic modulus of 110 MPa or more and 350 MPa or less as a particularly preferred range of elastic modulus. "C" was given to those with an elastic modulus of 70 MPa or more and less than 95 MPa, or more than 500 MPa and 800 MPa or less as an acceptable range of elastic modulus.

Figure 4:
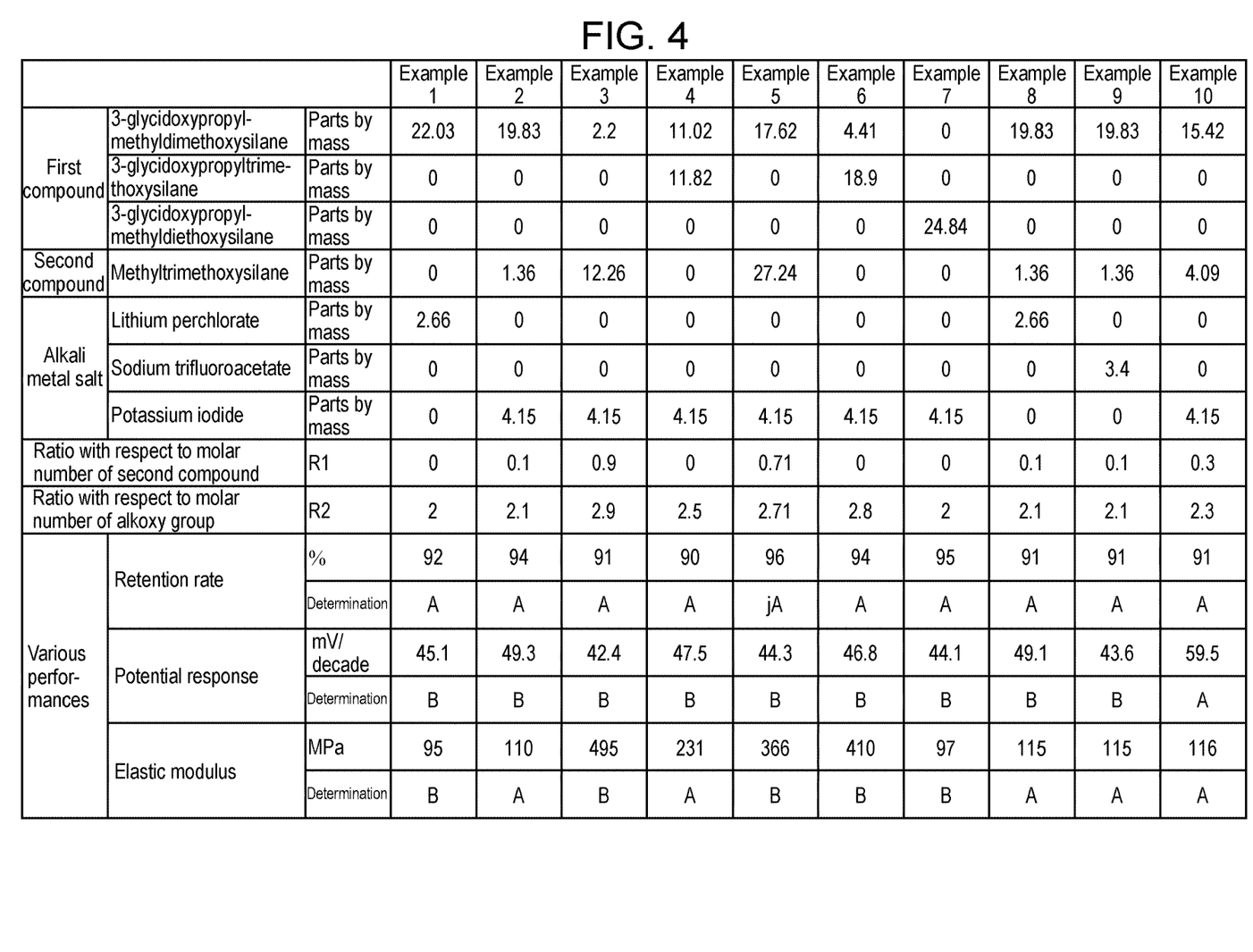
FIG. 4 is a table summarizing the results of Examples 1 to 10.
Figure 5:
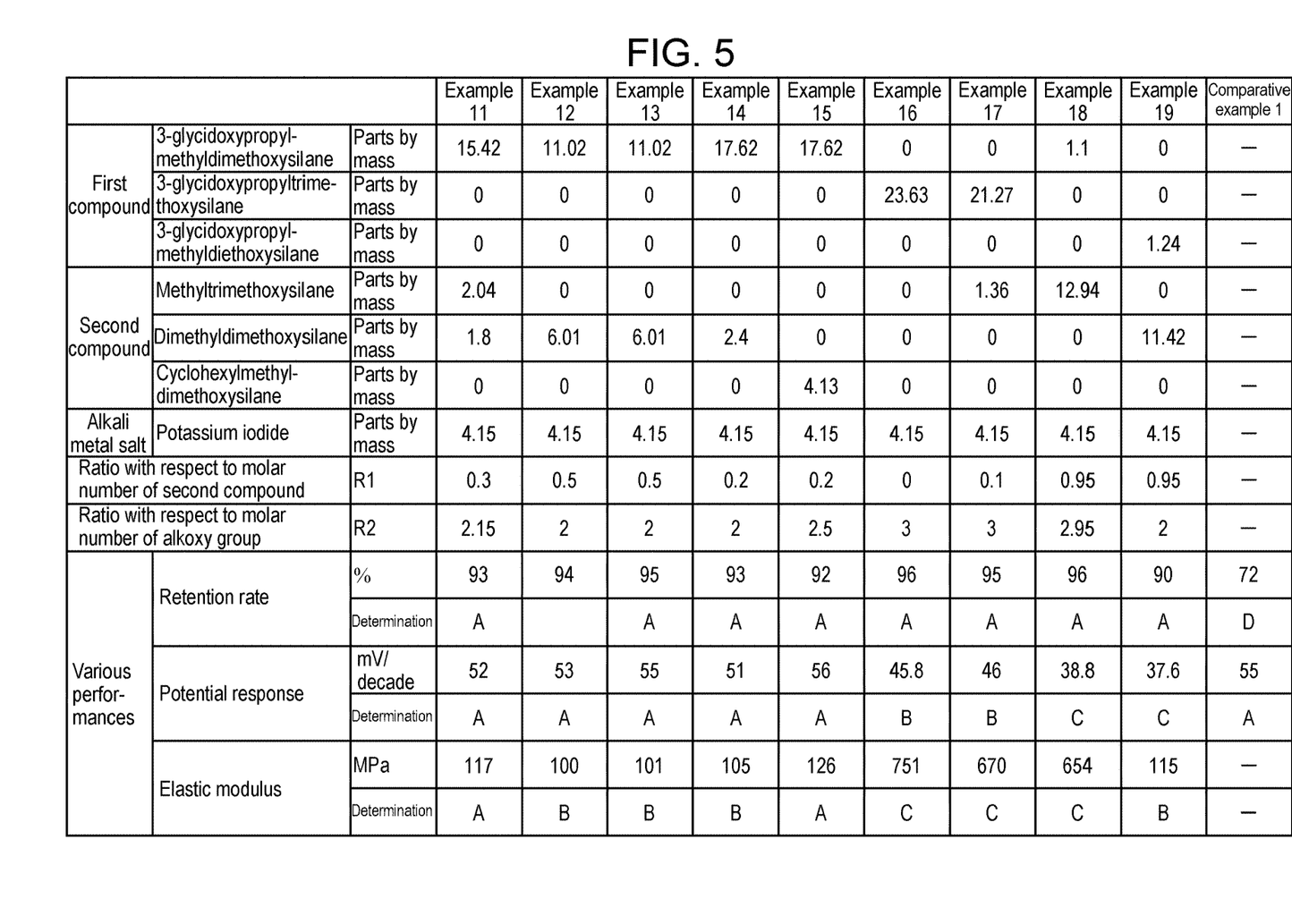
FIG. 5 is a table summarizing the results of Examples 11 to 19 and Comparative Example 1.

The results are shown in FIGS. 4 and 5. From the results of FIGS. 4 and 5, it can be considered as follows. Examples 1 to 19 are examples that satisfy all of the requirements specified in the exemplary embodiments of the present disclosure, and the retention rate is excellent.

In Examples 1 to 17, unlike Examples 18 and 19, R1 was in a preferable range (0.9 or less), so that the potential response was excellent in addition to the retention rate. Furthermore, in Examples 10 to 15, unlike Examples 1 to 9, 16 and 17, R1 was in a more preferable range (0.2≤R1≤0.5), so that the potential response was particularly excellent.

In Examples 1 to 15 and 19, unlike Examples 16 to 18, R2 was in a preferable range (2.00 or more and 2.90 or less), so that the elastic modulus was in a preferable range in addition to the retention rate. Furthermore, in Examples 2, 4, 8 to 11 and 15, unlike Examples 1, 3, 5 to 7, 12 to 14 and 19, R2 was in a more preferable range (2.10 or more and 2.50 or less), so that the elastic modulus was in a particularly preferable range.

On the other hand, Comparative Example 1 is an example in which the requirements specified in the exemplary embodiment of the present disclosure were not satisfied, and the retention rate was insufficient.

In Comparative Example 1, the ion-sensitive substance contained a cyclic structure, but did not have an alkoxysilyl group (or a silanol group after hydrolysis thereof) at the terminal, so that the retention rate was insufficient. Presumably, the ion-sensitive substance was lost during repeated measurements, resulting in a decrease in the retention rate.

The ion-sensitive substance of the present disclosure and the ion-sensitive membrane using the same can be used, for example, as an ion-selective electrode for measuring the ion activity dissolved in a liquid, and exhibits sufficient durability for repeated measurement, and has a high potential response and a preferable elastic modulus, so that it has high industrial utility value.

What is claimed is:

1. An ion-sensitive substance comprising:
   a crown ether structure composed of repeating units represented by formula (a):

—CR$^1$R$^2$—CR$^3$X—O—     (a)

where X is an organic group having an alkoxysilyl group at a terminal, with the proviso that at least one of the organic groups X has a silanol group at a terminal, and R$^1$, R$^2$ and R$^3$ are each a hydrogen atom or a hydrocarbon group,
   wherein a number of the organic groups X having terminal alkoxysilyl groups is the same as a number of oxygen atoms constituting the crown ether structure.

2. The ion-sensitive substance of claim 1,
   wherein the crown ether structure is a polymer containing a portion derived from a first compound having an epoxy group and an alkoxysilyl group at a terminal, and the polymer is obtained by ring-opening polymerization of the epoxy group with an alkali metal salt or a Group 2 element salt to form a ring.

3. The ion-sensitive substance of claim 1, wherein in formula (a), R$^1$, R$^2$ and R$^3$ are each a hydrogen atom and X is represented by formula (b):

—CH$_2$O—Y     (b)

wherein Y is a monovalent organic group having the alkoxysilyl group or the silanol group at a terminal.

4. The ion-sensitive substance of claim 2,
   wherein a cation of the alkali metal salt or the salt of the Group 2 element is any of lithium ion, sodium ion, and potassium ion.

5. The ion-sensitive substance of claim 1,
   wherein the number of repetitions of formula (a) is 4 or more and 6 or less.

6. An ion-sensitive membrane comprising the ion-sensitive substance of claim 1,
   wherein a portion derived from the alkoxysilyl group constitutes a siloxane bond.

7. The ion-sensitive membrane of claim 6,
   wherein the siloxane bond is constituted by a portion derived from the alkoxysilyl group in the crown ether structure and a portion derived from an alkoxysilyl group in a compound represented by formula (c):

R$^4$—Z     (c)

where R$^4$ is a monovalent hydrocarbon group, and
   Z is a monovalent organic group having an alkoxysilyl group at a terminal.

8. The ion-sensitive membrane of claim 7,
   wherein a ratio of a molar number of a portion derived from Z in formula (c) to a sum of a molar number of a portion derived from X in formula (a) and a molar number of a portion derived from Z in formula (c) is 0.9 or less.

9. The ion-sensitive membrane of claim 7,
   wherein a ratio of a sum of a molar number of a portion derived from the alkoxy group in X and a molar number of a portion derived from the alkoxy group in Z to a sum of a molar number of a portion derived from X in formula (a) and a molar number of a portion derived from Z in formula (c) is 2.00 or more and 2.90 or less.

10. An ion-sensitive substance comprising
a crown ether structure composed of repeating units represented by formula (a):

$$—CR^1R^2—CR^3X—O—  \quad (a)$$

where X is an organic group having an alkoxysilyl group at a terminal, with the proviso that at least one of the organic groups X has a silanol group at a terminal, and $R^1$, $R^2$ and $R^3$ are each a hydrogen atom or a hydrocarbon group, wherein the crown ether structure is any one of 12-Crown-4, 15-Crown-5 or 18-Crown-6, and a number of the organic groups X having terminal alkoxysilyl groups is the same as a number of oxygen atoms constituting the crown ether structure.

11. The ion-sensitive substance of claim 10,
wherein the crown ether structure is a polymer containing a portion derived from a first compound having an epoxy group and an alkoxysilyl group at a terminal, and the polymer is obtained by ring-opening polymerization of the epoxy group with an alkali metal salt or a Group 2 element salt to form a ring.

12. The ion-sensitive substance of claim 10,
wherein in formula (a), $R^1$, $R^2$ and $R^3$ are each a hydrogen atom and X is represented by formula (b):

$$—CH_2O—Y \quad (b)$$

wherein Y is a monovalent organic group having the alkoxysilyl group or the silanol group at a terminal.

13. The ion-sensitive substance of claim 11,
wherein a cation of the alkali metal salt or the salt of the Group 2 element is any of lithium ion, sodium ion, and potassium ion.

* * * * *